United States Patent
Fan et al.

(10) Patent No.: US 9,351,236 B2
(45) Date of Patent: May 24, 2016

(54) UICC CARRIER SWITCHING VIA OVER-THE-AIR TECHNOLOGY

(75) Inventors: James Fan, San Ramon, CA (US); David Fenglin Chen, Fremont, CA (US); Richard T. Kuo, Mountain View, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 394 days.

(21) Appl. No.: 13/186,050

(22) Filed: Jul. 19, 2011

(65) Prior Publication Data

US 2013/0023235 A1    Jan. 24, 2013

(51) Int. Cl.
 *H04W 48/18* (2009.01)
 *H04W 4/00* (2009.01)
 *H04W 60/00* (2009.01)
 *H04W 8/24* (2009.01)

(52) U.S. Cl.
 CPC .............. *H04W 48/18* (2013.01); *H04W 4/001* (2013.01); *H04W 4/003* (2013.01); *H04W 8/245* (2013.01); *H04W 60/005* (2013.01)

(58) Field of Classification Search
 CPC ..... H04W 48/18; H04W 4/001; H04W 4/003; H04W 60/005; H04W 8/30; H04W 8/245; H04L 63/0853; H04M 15/00; H04M 15/18; H04M 15/58; G06F 17/30073; G06F 17/30147; G06F 17/30132; G06F 11/1446; G06F 3/0608
 USPC ............ 455/411, 410, 432.1, 558, 418, 422.1
 See application file for complete search history.

(56) References Cited

U.S. PATENT DOCUMENTS

| | | | |
|---|---|---|---|
| 6,321,079 B1 | 11/2001 | Cooper | |
| 7,715,833 B2 | 5/2010 | Sanchez | |
| 7,813,725 B2 | 10/2010 | Celik | |
| 7,941,184 B2 | 5/2011 | Prendergast et al. | |
| 2003/0038791 A1* | 2/2003 | Chou | |
| 2005/0108534 A1* | 5/2005 | Bajikar | G06F 21/606 713/172 |
| 2005/0220280 A1* | 10/2005 | Steinberg | 379/93.12 |
| 2007/0226374 A1* | 9/2007 | Quarterman et al. | 709/250 |
| 2008/0090614 A1 | 4/2008 | Sicher et al. | |
| 2008/0288585 A1 | 11/2008 | Choi et al. | |
| 2008/0300007 A1* | 12/2008 | Kim | 455/552.1 |
| 2009/0086978 A1* | 4/2009 | McAvoy et al. | 380/279 |
| 2010/0062808 A1* | 3/2010 | Cha et al. | 455/558 |
| 2010/0093396 A1 | 4/2010 | Roundtree | |
| 2010/0190470 A1* | 7/2010 | Raleigh | 455/406 |
| 2010/0279655 A1 | 11/2010 | Larsson | |
| 2010/0304670 A1 | 12/2010 | Shuo | |
| 2010/0311444 A1* | 12/2010 | Shi et al. | 455/466 |
| 2011/0225008 A1* | 9/2011 | Elkouh et al. | 705/3 |
| 2011/0269456 A1* | 11/2011 | Krishnaswamy et al. | 455/426.1 |

(Continued)

*Primary Examiner* — George Eng
*Assistant Examiner* — Hung Du
(74) *Attorney, Agent, or Firm* — Hartman & Citrin LLC

(57) ABSTRACT

Devices, systems, and methods are disclosed which relate to provisioning a universal integrated circuit card (UICC) with multiple services. The UICC enables a wireless communication device to communicate through multiple carriers by using a unique virtual subscriber identity module (SIM) to register with each carrier. The unique virtual SIM is one of a plurality of virtual SIMs stored on and managed by the UICC. A carrier network includes a server for provisioning a new virtual SIM on a UICC over-the-air (OTA) when a new customer requests a service such as voice, data, or other type of service. These UICCs may also include logic to automatically select the best carrier for a voice call depending on the user settings.

20 Claims, 7 Drawing Sheets

(56) References Cited

U.S. PATENT DOCUMENTS

| | | | |
|---|---|---|---|
| 2012/0117635 A1* | 5/2012 | Schell et al. | 726/9 |
| 2012/0150815 A1* | 6/2012 | Pafumi et al. | 707/679 |
| 2012/0166997 A1* | 6/2012 | Cho et al. | 715/778 |
| 2012/0178402 A1* | 7/2012 | Krishnamoorthy et al. | 455/404.1 |
| 2012/0282915 A1* | 11/2012 | Haynes et al. | 455/422.1 |

* cited by examiner

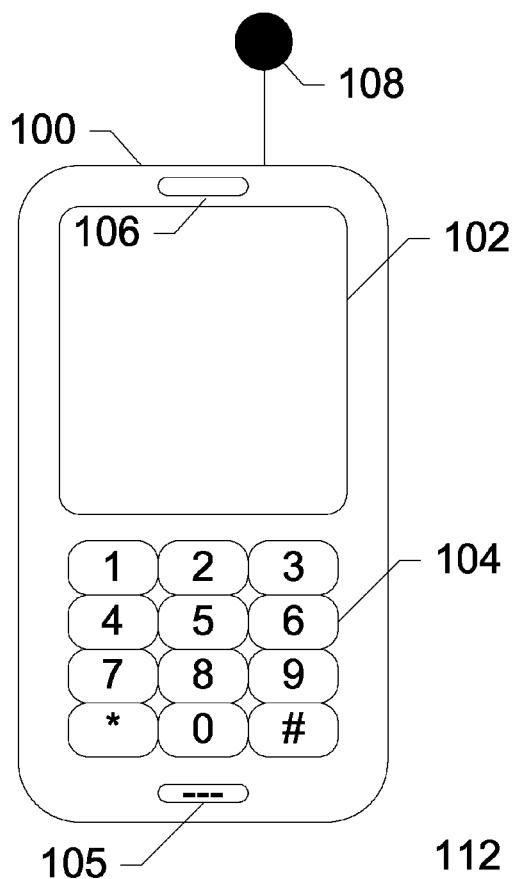
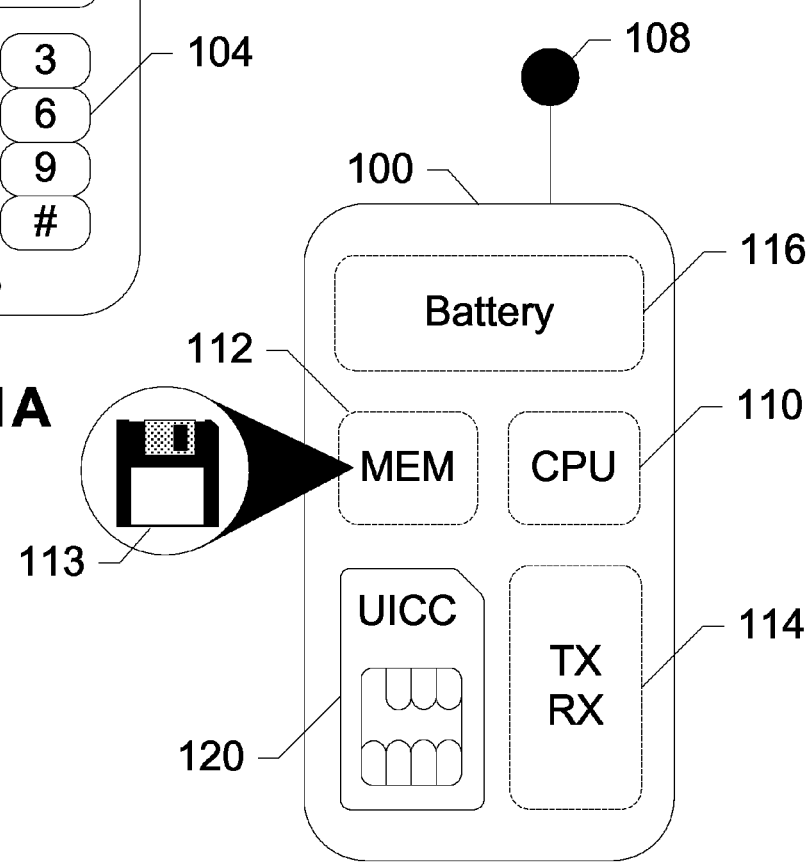
FIG. 1A
FIG. 1B

UICC CARRIER SWITCHING VIA OVER-THE-AIR TECHNOLOGY

BACKGROUND OF THE SUBJECT DISCLOSURE

1. Field of the Subject Disclosure

The present subject disclosure relates to Universal Integrated Circuit Cards (UICCs). More specifically, the present subject disclosure relates to over-the-air (OTA) programming of virtual subscriber identity modules (SIM) on a UICC.

2. Background of the Subject Disclosure

In North American market segments, cellular telephones are locked to a specific carrier using different types of locking methods. Many of these methods involve locking the subscriber identity module (SIM) card inside of a cellular telephone. When a cellular telephone is locked, the telephone cannot be used with a different carrier. This has prompted many illegal ways to unlock a cellular telephone. One of the key reasons for carrier to lock a telephone is because the carriers subsidize the initial cost of the telephone, hoping to recoup the money from a long term subscriber contract. Outside of the North American markets, certain countries do not permit SIM-locking a cellular telephone. In order to switch to a different carrier, the subscriber needs to visit a store and have a technician provision the telephone to a different carrier.

A subscriber can purchase an unlocked cellular telephone with a much higher price tag and decide which carrier to go to for wireless service. A subscriber will get wireless service with subsidized telephone(s), but the subscriber is then locked into a two year contract. When a subscriber enters an area outside of his provider service domain, roaming service will start, which usually incurs an extra charge. Moreover, unlocked cellular telephones are priced substantially higher than locked telephones. A subscriber who is locked into a two year contract may have to pay an early cancellation fee to break the contract. A subscriber who is out of the service provider serving area may have to pay a roaming fee or end up buying another prepaid phone from the local service provider to avoid the high roaming charges. Even though some service providers offer a way to unlock a cellular telephone when it is outside of the service area, the process is cumbersome and ineffective.

SUMMARY OF THE SUBJECT DISCLOSURE

The subject disclosure solves the above problems by provisioning a universal integrated circuit card (UICC) with multiple services. In exemplary embodiments, the UICC enables a wireless communication device to communicate through multiple carriers by using a unique virtual subscriber identity module (SIM) to register with each carrier. The unique virtual SIM is one of a plurality of virtual SIMs stored on and managed by the UICC. A carrier network includes a server for provisioning a new virtual SIM on a UICC over-the-air (OTA). This OTA provisioning occurs when a new customer requests a service such as voice, data, or other type of service. When the carrier detects a new SIM attempting to access the network, the server transmits an offer for service. This enables services to be provided individually, such that a wireless device may access one carrier for voice, another carrier for data, and yet another carrier for messaging. A UICC may have multiple virtual SIMs for voice alone, and in some instances may be in an area where more than one can be used. These UICCs may also include logic to automatically select the best carrier for a voice call depending on the user settings. For instance, the user may assign higher priority to cheaper carriers or better quality carriers.

This disclosure presents a novel wireless service model. In exemplary embodiments of this model, a wireless communication device is equipped with a UICC platform enabling provisioning of multiple bearer services from multiple carriers simultaneously, switching carriers using OTA technology on the fly, and subscribing to a new local carrier while out of a main carrier's service domain. This can potentially eliminate the need for roaming agreements among carriers, because the user can subscribe when and wherever service is needed.

The subject disclosure offers a model where a wireless communication device is unlocked from any carrier and has no cumbersome requirement to provision the wireless communication device for another carrier, such as getting to a store of a first carrier. Once acquired, subscribers will be free to choose any carrier they wish. Services are provisioned via OTA technology. When a subscriber purchases a wireless communication device with a UICC card from a retailer, the subscriber may get a rebate back from the retailer after he/she signs a contract with a carrier or meets a pre-set quota of services or advertisement views.

Exemplary embodiments of the subject disclosure enable subscribers to freely choose a service provider without signing a service contract. This enables carriers to acquire new subscribers on the fly. This allows subscribers to subscribe to bearer services from more than one service provider at a time. When there is congestion in one carrier's network, that carrier may optionally migrate some traffic to its competitor's network without the knowledge of the subscribers. The competitor will get some compensation and the carrier gets traffic relief.

In one exemplary embodiment, the present subject disclosure is a method for provisioning a universal integrated circuit card (UICC) with a service, the UICC coupled to a wireless communication device. The method including receiving an offer for a first service on the wireless communication device, provisioning a first virtual subscriber identity module (SIM) with the first service, adding the first virtual SIM to the UICC, and connecting the wireless communication device to the service using the virtual SIM.

In another exemplary embodiment, the present subject disclosure is a universal integrated circuit card (UICC) for provisioning a service, the UICC coupled with a wireless communication device. The UICC includes a processor, a memory in communication with the processor, and a provision logic stored on the memory, the provision logic for receiving an offer for a first service, provisioning a first virtual subscriber identity module (SIM) with the first service, adding the first virtual SIM to the memory, and connecting the wireless communication device to the service using the virtual SIM.

In yet another exemplary embodiment, the present subject disclosure is a system for provisioning a service on a universal integrated circuit card (UICC), the UICC coupled with a wireless communication device. The system includes an over-the-air (OTA) server in communication with the wireless communication device, and an OTA logic stored on the OTA server, the OTA logic for receiving acceptance of an offer for a first service from the wireless communication device, and provisioning a first virtual subscriber identity module (SIM) with the first service. The first virtual SIM is added to the UICC, and the wireless communication device connects to the service using the virtual SIM.

BRIEF DESCRIPTION OF THE DRAWINGS

FIG. 1A shows a wireless communication device for OTA carrier switching, according to an exemplary embodiment of the subject disclosure.

FIG. 1B shows the inner components of a wireless communication device for OTA carrier switching, according to an exemplary embodiment of the subject disclosure.

DETAILED DESCRIPTION OF THE SUBJECT DISCLOSURE

Figure 2:
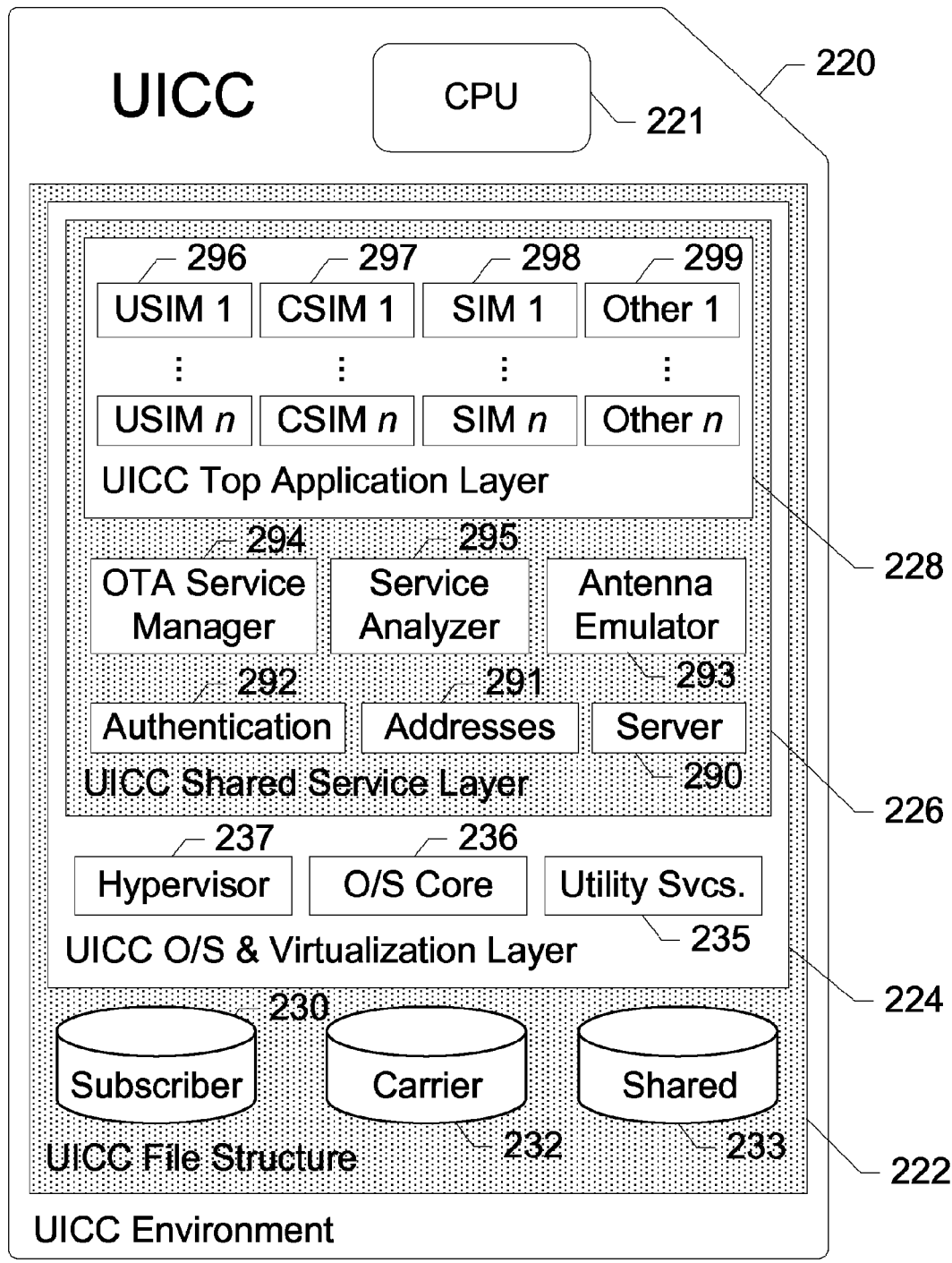
FIG. 2 shows architecture for a UICC capable of OTA carrier switching, according to an exemplary embodiment of the subject disclosure.

The subject disclosure solves the above problems by provisioning a universal integrated circuit card (UICC) with multiple services. In exemplary embodiments, the UICC enables a wireless communication device to communicate through multiple carriers by using a unique virtual subscriber identity module (SIM) to register with each carrier. The unique virtual SIM is one of a plurality of virtual SIMs stored on and managed by the UICC. A carrier network includes a server for provisioning a new virtual SIM on a UICC over-the-air (OTA). This OTA provisioning occurs when a new customer requests a service such as voice, data, or other type of service. When the carrier detects a new SIM attempting to access the network, the server transmits an offer for service. This enables services to be provided individually, such that a wireless device may access one carrier for voice, another carrier for data, and yet another carrier for messaging. A UICC may have multiple virtual SIMs for voice alone, and in some instances may be in an area where more than one can be used. These UICCs may also include logic to automatically select the best carrier for a voice call depending on the user settings. For instance, the user may assign higher priority to cheaper carriers or better quality carriers.

"Wireless communication device", as used herein and throughout this disclosure, refers to any electronic device capable of wirelessly sending and receiving data. A wireless communication device may have a processor, a memory, a transceiver, an input, and an output. Examples of such devices include cellular telephones, personal digital assistants (PDAs), portable computers, etc. The memory stores applications, software, or logic. Examples of processors are computer processors (processing units), microprocessors, digital signal processors, controllers and microcontrollers, etc. Examples of device memories that may comprise logic include RAM (random access memory), flash memories, ROMS (read-only memories), EPROMS (erasable programmable read-only memories), and EEPROMS (electrically erasable programmable read-only memories).

"Logic", as used herein and throughout this disclosure, refers to any information having the form of instruction signals and/or data that may be applied to direct the operation of a processor. Logic may be formed from signals stored in a device memory. Software is one example of such logic. Logic may also be comprised by digital and/or analog hardware circuits, for example, hardware circuits comprising logical AND, OR, XOR, NAND, NOR, and other logical operations. Logic may be formed from combinations of software and hardware. On a telecommunication network, logic may be programmed on a server, or a complex of servers. A particular logic unit is not limited to a single logical location on the telecommunication network.

Wireless communication devices communicate with each other and with other elements via a network, for instance, a wireless network, or a wireline network. A "network" can include broadband wide-area networks such as cellular networks, local-area networks (LAN), and personal area networks, such as near-field communication (NFC) networks including BLUETOOTH®. Ultra-wide area networks are often controlled by carriers. A "carrier", as used herein and throughout this disclosure, refers to an entity operating a network. In many instances, carriers require authentication before allowing subscribers to communicate through the network. Examples of carriers include AT&T, VERIZON, SPRINT, T-MOBILE, etc. Carriers provide a wide array of services for subscribers. A "service", as used herein and throughout this disclosure, refers to any form of communication performed through a carrier network. Examples of services include, voice, internet and other data, messaging, media, gaming, etc. Services also include applications such as location-based services, adaptive user interfaces, pushed recommendations/advertising, etc.

Communication across a network is preferably packet-based; however, radio and frequency/amplitude modulations networks can enable communication between wireless communication devices using appropriate analog-digital-analog converters and other elements. Communication is enabled by hardware elements called "transceivers." Wireless communication devices may have more than one transceiver, capable of communicating over different networks. For example, a cellular telephone can include one or more cellular transceivers for communicating with cellular base stations, a Wi-Fi transceiver for communicating with a Wi-Fi network, and a BLUETOOTH® transceiver for communicating with a BLUETOOTH® device. A network typically includes a plurality of elements that host logic for performing tasks on the network.

For the following description, it can be assumed that most correspondingly labeled structures across the figures (e.g., 132 and 232, etc.) possess the same characteristics and are subject to the same structure and function. If there is a difference between correspondingly labeled elements that is not pointed out, and this difference results in a non-corresponding structure or function of an element for a particular embodiment, then that conflicting description given for that particular embodiment shall govern.

FIG. 1A shows a wireless communication device 100 for OTA carrier switching, according to an exemplary embodiment of the subject disclosure. Wireless communication device 100 includes a display 102, a keypad 104, a microphone 105, a speaker 106, and an antenna 108. Display 102 is a liquid crystal display (LCD) that serves as a visual output for the user. Display 102 is used to display a user interface for an operating system, as well as notifications of service offers and service changes. Keypad 104 is an input for entering information and commands to wireless communication device 100. Microphone 105 accepts aural input and allows wireless communication device 100 to deliver voice communication to the network and other wireless communication devices. Speaker 106 outputs audio, and also allows voice communication with other wireless communication devices. Antenna 108 is a transducer for transmitting and receiving wireless radio frequency (RF) signals to and from wireless networks, network nodes, and other wireless devices.

FIG. 1B shows the inner components of a wireless communication device 100 for OTA carrier switching, according to an exemplary embodiment of the subject disclosure. The internal components of wireless communication device 100 include a processor 110, a memory 112 storing a logic 113, a transceiver 114, and a battery 116. Wireless communication device 100 is also coupled with UICC 120, which is explained in further detail below. Processor 110 receives input and issues commands to deliver output through the other components. Memory 112 stores information including logic 113 for enabling processor 110 to operate the other components of wireless communication device 100. Logic 113 includes an operating system, programs to help manage UICC 120, etc. Transceiver 114 converts wireless signals received by antenna 108 to information capable of processing by processor 110, and vice-versa, and to communicate with a network and other wireless communication devices. Transceiver 114 uses one or more wireless protocols including, GSM, GPRS, UMTS, W-CDMA, LTE, WiFi, BLUETOOTH, ZIGBEE, Z-WAVE, etc., to communicate with wide-area network nodes and/or other wireless communication devices within range. Battery 116 powers wireless communication device 100, and may be rechargeable via an external power source.

There are many embodiments of a wireless communication device that are capable of being used in accordance with the subject disclosure. In other embodiments of the wireless communication device, other displays are used, such as an LED display, OLED display, etc. In some embodiments, the display is used as a touch-sensitive input device, i.e. a touch screen. A touch screen allows the user to view output on the display as well as use the display to provide input. In some touch screen embodiments the mobile device may not have a physical keypad for input. Instead, a virtual keypad is displayed on the touch screen and the user inputs by touching the virtual keys. Other forms of input such as full keyboards, accelerometers, motion sensors, etc., may be utilized in the wireless communication device. The memory may be a non-removable internal memory, or a removable memory coupled to a SIM card or a memory card inserted into a memory card reader. Many mobile devices have more than one transceiver or a transceiver that supports more than one protocol. For instance, it is not uncommon for a mobile device to support cellular radio frequency (RF), GSM, GPRS, UMTS, W-CDMA, LTE, NFC, WiFi, BLUETOOTH®, ZIGBEE®, and Z-WAVE® protocols. A wireless communication device involving multiple modes of wireless communications, such as cellular, WiFi, NFC, etc., may contain a plurality of antennas on a single device. For example, an NFC-enabled wireless communication device has separate antennas for cellular and NFC communications respectively.

FIG. 2 shows architecture for a UICC 220 capable of OTA carrier switching, according to an exemplary embodiment of the subject disclosure. UICC 220 is a memory card including a UICC processor 221. UICC 220 stores an architectural framework including four layers of function to protect privacy, security, and accuracy. The lowest level of function is the UICC file structure 222. UICC file structure 222 includes information privileged to the subscriber 230, information privileged to the carrier 232, and shared information between carriers 233, such as address book data. Within UICC file structure 222 is an operating system and virtualization layer 224. Operating system and virtualization layer 224 includes a hypervisor 237, an operating system core 236, and utility services 235. Operating system and virtualization layer 224 offers operating systems 236 and utilities 235 as well as virtualization software which allow various virtual SIMs to be run on a list of supported operating systems. The virtualization software also manages UICC file structure 222's virtual storage needs to accommodate APPLE iOS, GOOGLE ANDROID, and other operating systems. Within operating system and virtualization layer 224 is a shared service layer 226. Shared service layer 226 includes many shared modules to be used by all virtual SIM modules. The shared modules include an authentication module 292, an addresses module 291, a server module 290, an OTA interaction management module 294, a bearer service analysis module 295, and an antenna emulation module 293. Shared authentication module 292 helps virtual SIMs to be authenticated by a carrier to provide bearer services. Shared addresses module 291 allows different virtual SIM modules to refer to address book resources such as those within file structure 222. UICC 220 may further run multiple virtual web servers using server module 290. All virtual SIM modules can offer these web servers to consumers and can access web servers from UICCs of other wireless communication devices. OTA service manager module 294 manages all OTA messages for all virtual SIMs. Service analyzer module 295 analyzes the best bearer service among multiple carriers and provides a recommendation to a subscriber who will decide which carrier's bearer service to utilize at that time. Service analyzer module 295 may also automatically select the best service based on programmed criteria such as network traffic, reliability based on past trends, or cost of service. The included antenna in some wireless communication devices cannot receive a clear signal from every carrier, because it is designed for one specific carrier. Antenna emulation module 293 can help receive signals from other carriers.

Also within shared service layer 226 is top application layer 228. Top application layer 228 includes all of the virtual SIMs provisioned for communication with carrier networks. The virtual SIM application can emulate multiple 4G USIM modules 296, 3G CSIM modules 297, ISIM (IP Multimedia Services Identity Module), 2G SIM modules 298, or any other type of SIM module 299. Each instance of the virtual SIM modules 1 through n may be associated with a dedicated service provider (active or inactive). For example, a USIM (UMTS virtual SIM 296) 1 may be associated to carrier AT&T while USIM 2 may be associated to carrier T-MOBILE. The association does not need to be fixed. Virtual SIM modules may be reconfigured and associated with new carriers. Virtual SIM modules may be copied or archived to an encrypted partition of storage on UICC 220, to a memory within a coupled wireless communication device, or to any device in communication with UICC 220 or the coupled wireless communication device, and reconfigured to be used for roaming, etc. Subsequently, the virtual SIM may be reconfigured back to the normal configuration by retrieving the configuration data from the encrypted storage.

Exemplary embodiments of the subject disclosure allow a wireless communication device equipped with such a UICC to select a carrier or switch to a carrier via OTA technology without the need to pre-provision the wireless communication device with the carrier. The wireless communication device carries virtual SIMs for multiple carriers at the same time. The subscriber may demand a specific international mobile subscriber identity (IMSI) number to be assigned to any virtual SIM. In doing so, the subscriber may retain a consistent identity for their wireless communications device by keeping the same IMSI for all virtual SIMs, or maintain multiple identities on the same device by assigning specific IMSIs. Using virtualization, a virtual SIM can operate many operating systems including GOOGLE ANDROID, IPHONE, RIM BLACKBERRY, SYMBIAN, and WINDOWS MOBILE.

Figure 3:
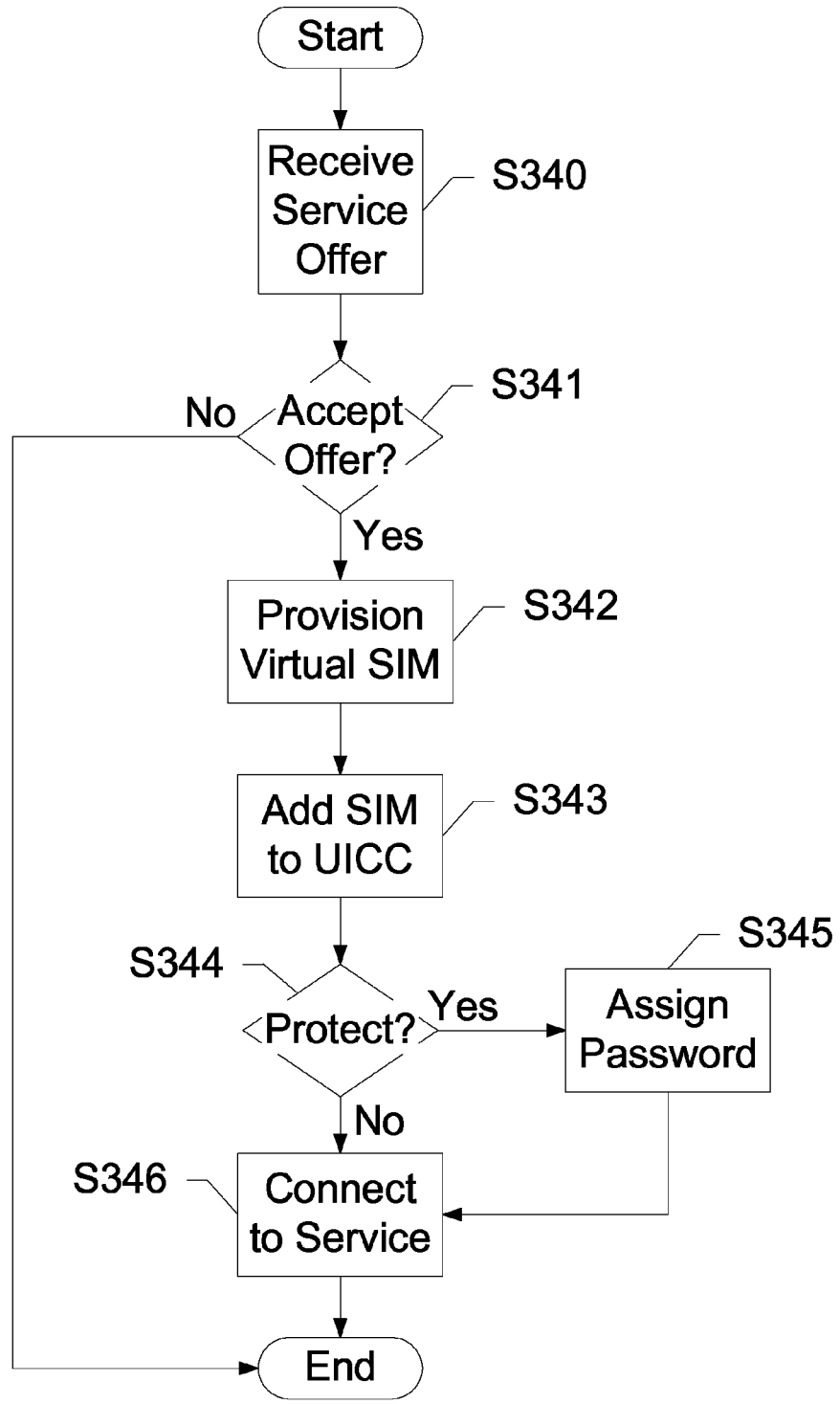
FIG. 3 shows an OTA method of adding a new carrier to a UICC, according to an exemplary embodiment of the subject disclosure.

FIG. 3 shows an OTA method of adding a new carrier to a UICC, according to an exemplary embodiment of the subject disclosure. The method begins when a wireless communication device receives, via its antenna/transceiver combination, an offer for service S340 from a carrier. The offer is for an individual service, such as voice, data, etc. Once received, the user of the wireless communication device decides whether or not to accept the offer S341. If the user does not accept the offer, then the method ends. Once accepted, a server on the carrier's network begins an OTA provisioning of a virtual SIM on the UICC of the wireless communication device S342. Provisioning S342 may include adding security authentication and ciphering information such as temporary information related to the carrier's network, a list of the services the user has access to, passwords, etc. Once the virtual SIM is provisioned, the virtual SIM is added to the UICC S343. The user may opt to protect the virtual SIM with a password S344. If the user does opt to protect the virtual SIM with a password, then a password must be created S345. Once a password has been created, or alternately a password is elected not to be assigned, the wireless communication device connects to the service through the new virtual SIM S346.

In exemplary embodiments, a UICC may include several virtual SIMs. If creating a new virtual SIM requires more memory than what is available on the UICC, then old virtual SIMs are moved onto an encrypted storage domain on either the wireless communication device or a storage domain on the network. Alternatively, the virtual SIMs may be removed or archived based on the expiration of a time, or based upon a trigger from the network that the SIM is no longer in active use. In some exemplary embodiments, the service offer will be accompanied by a coupon or some form of discount as an incentive to subscribe to the service. Password assignment is just one of the methods for protecting a newly created virtual SIM. Biometrics, physical keys, and any other form of protection may be used to keep virtual SIMs private.

Figure 4:
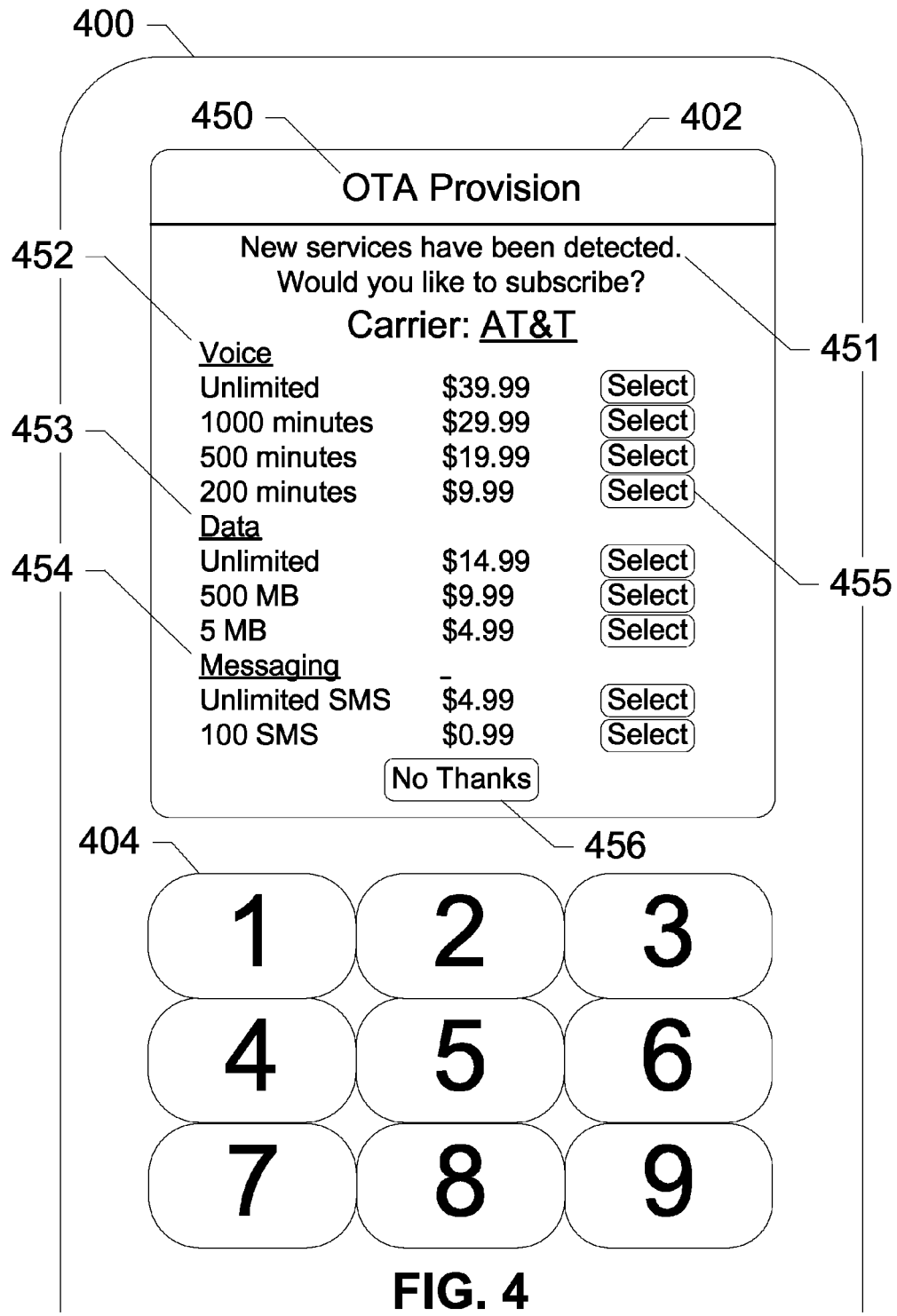
FIG. 4 shows a screen shot for OTA provisioning of a new service on a wireless communication device, according to an exemplary embodiment of the subject disclosure.

FIG. 4 shows a screen shot for an offer of OTA provisioning of a new service 450 on a wireless communication device 400, according to an exemplary embodiment of the subject disclosure. Offer 450 includes an introductory message 451 including identification of the carrier, a plurality of voice services 452, a plurality of data services 453, a plurality of messaging services 454, a select button 455 for each service, and a cancel button 456. Plurality of voice services 452 is divided into plans priced by the amount of minutes of talk time. Plurality of data services 453 and plurality of messaging services 454 are divided into plans priced by data volume in megabytes, and number of messages, respectively. Each voice, data, and messaging service is associated with a select button. When wireless communication device 400 enters an area covered by the carrier, new service offer 450 is sent to wireless communication device 400. The user may select any of the services 452-454 by activating the respective select button 455. If the user does not wish to subscribe to any of the offered services, then the user may use the No Thanks button. Activating this button dismisses the OTA provisioning alert 450 and reverts the user interface back to the phone operating system or whatever screen the user was previously on.

Figure 5:
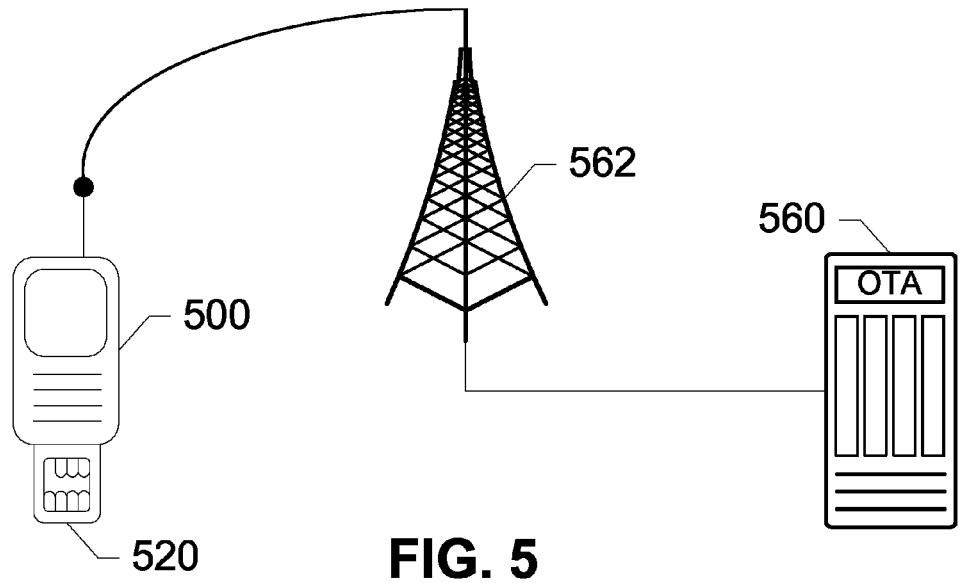
FIG. 5 shows a system for OTA provisioning of a new service, according to an exemplary embodiment of the subject disclosure.

The OTA provisioning offer screen is launched by the UICC using one or more of the applications on the UICC. For instance, the OTA service manager onboard the UICC Shared Service Layer generates a pop-up window that takes the focus of the wireless device display until the user selects which services to provision, if any. Other means of conveying the same information will become apparent to persons skilled in the art in light of this disclosure FIG. 5 shows a system for OTA provisioning of a new service, according to an exemplary embodiment of the subject disclosure. The system includes a wireless communication device 500 having a UICC 520, a base station 562, and an OTA server 560. Other network elements are not shown but will be apparent to those skilled in the art, such as routers, switches, proxies, etc. When wireless communication device 500 enters an area covered by base station 562, a new service offer is sent from OTA server 560 to wireless communication device 500 as described herein. The offer is presented to the user of wireless communication device 500, so that the user can decide on which services to subscribe. Once the user has decided to subscribe to a service, acceptance of the offer is sent back to OTA server 560 from wireless communication device 500. OTA server 560 then provisions a virtual SIM for the service onto UICC 520. Whenever wireless communication device 500 requires this service, UICC 520 loads and uses the virtual SIM to register with the carrier using OTA server 560.

Figure 6:
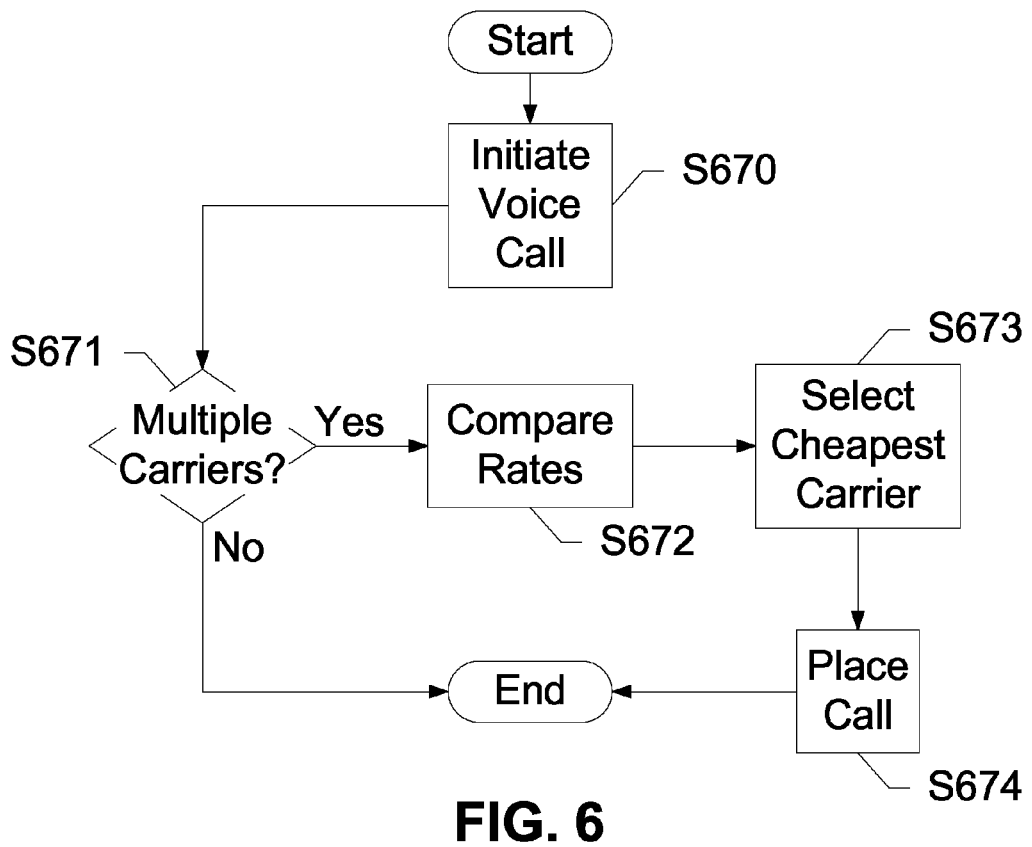
FIG. 6 shows a method of selecting from multiple carriers on a UICC, according to an exemplary embodiment of the subject disclosure.

FIG. 6 shows a method of selecting from multiple carriers on a UICC, according to an exemplary embodiment of the subject disclosure. The method begins when a user of a wireless communication device having multiple virtual SIMs on a UICC initiates a voice call S670. Before loading a virtual SIM to carry out this request, the UICC first checks via the wireless communication device antenna to see if there is more than one available carrier S671. If only one carrier exists, then the UICC is forced to use that carrier, and the method ends. However, if more than one carrier exists, then the UICC can compare quality and rates to determine the most ideal carrier S672. The user of the wireless communication device presets priorities for services. Depending on the service, or other factors, a user may want the cheapest service, or the highest quality service. These priorities are also stored on the UICC, and are readily available for the UICC to acknowledge. Once the priority is retrieved, the UICC can determine the best carrier S673. In this exemplary embodiment, the user has set the priority for voice calling at the cheapest option. The UICC then loads the virtual SIM for the cheapest carrier, and places the call S674.

Other factors may be considered in the comparison of services. These factors include historical trends, crowd-sourced information about the carriers, etc.

Figure 7:
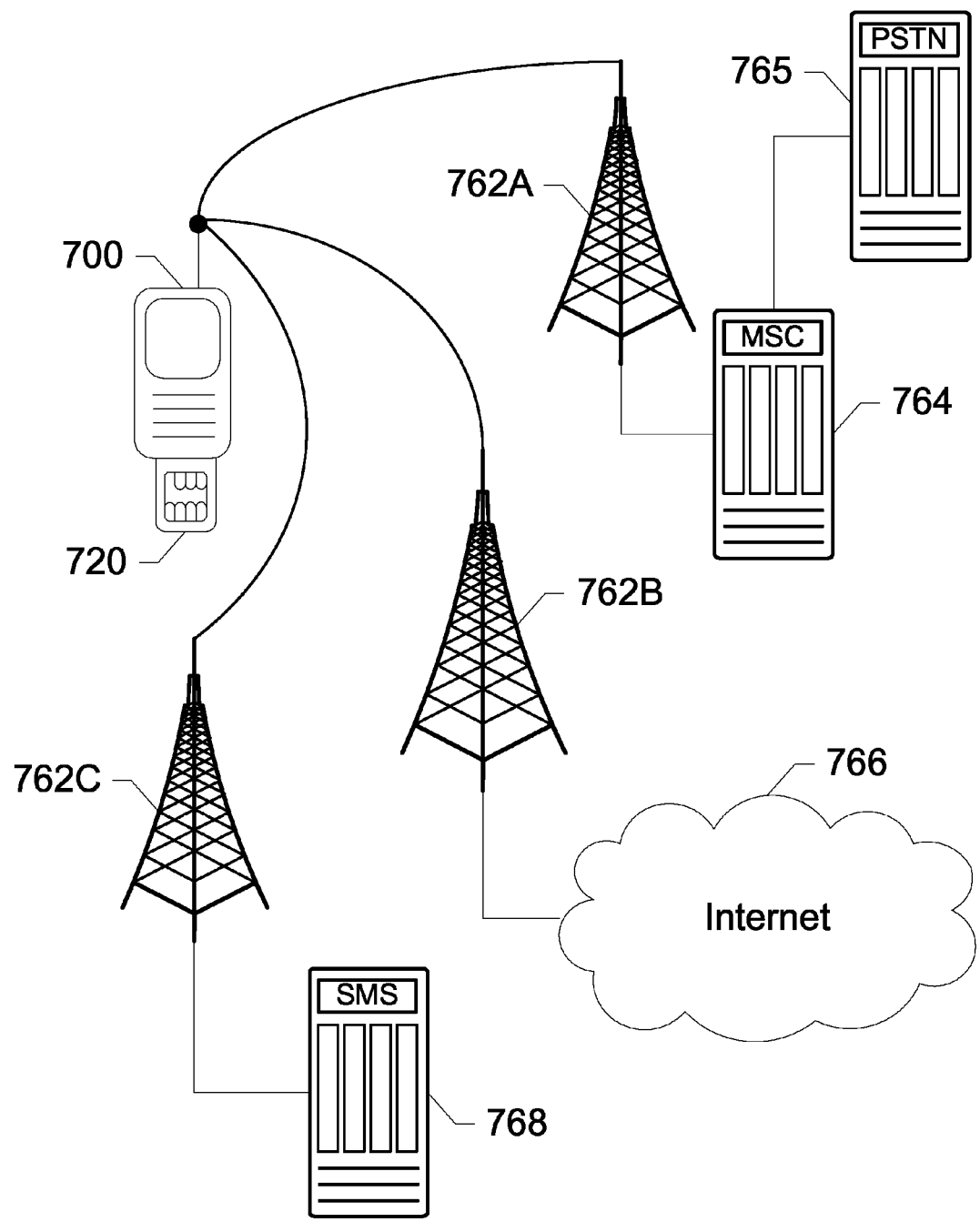
FIG. 7 shows a system for OTA carrier switching, according to an exemplary embodiment of the subject disclosure.

FIG. 7 shows a 2G/3G based voice and SMS system for OTA carrier switching, according to an exemplary embodiment of the subject disclosure. The system includes a wireless communication device 700 having a UICC 720, a voice carrier base station 762A in communication with a mobile switching center (MSC) 764 and a public switched telephone network (PSTN) 765, a data carrier base station 762B providing a connection to the internet 766, and a messaging carrier base station 762C providing access to a short messaging service (SMS) server 768. UICC 720 includes a virtual SIM for each carrier. Other elements for establishing communication are not shown and will be known to those having ordinary skill in the art, such as routers, switches, proxies, etc.

Also, the voice service in the LTE environment may be migrated to VoLTE (IMS based Voice over LTE) or OTT VoIP .etc. SMS in the LTE environment will be also migrated into IP based messaging service.

Before using a voice service, the UICC loads the virtual SIM for the voice carrier, and connects to a base station. Likewise, before using data and messaging services, the UICC loads the respective virtual SIM and connects to the respective base station. Multiple virtual SIMs can be loaded and used at the same time so that services can be used simultaneously. New offers are prompted before the user so that the user can select and approve the use of services. Once the services have been approved, the UICC automates virtual SIM switching to use the most desirable service.

Figure 8:
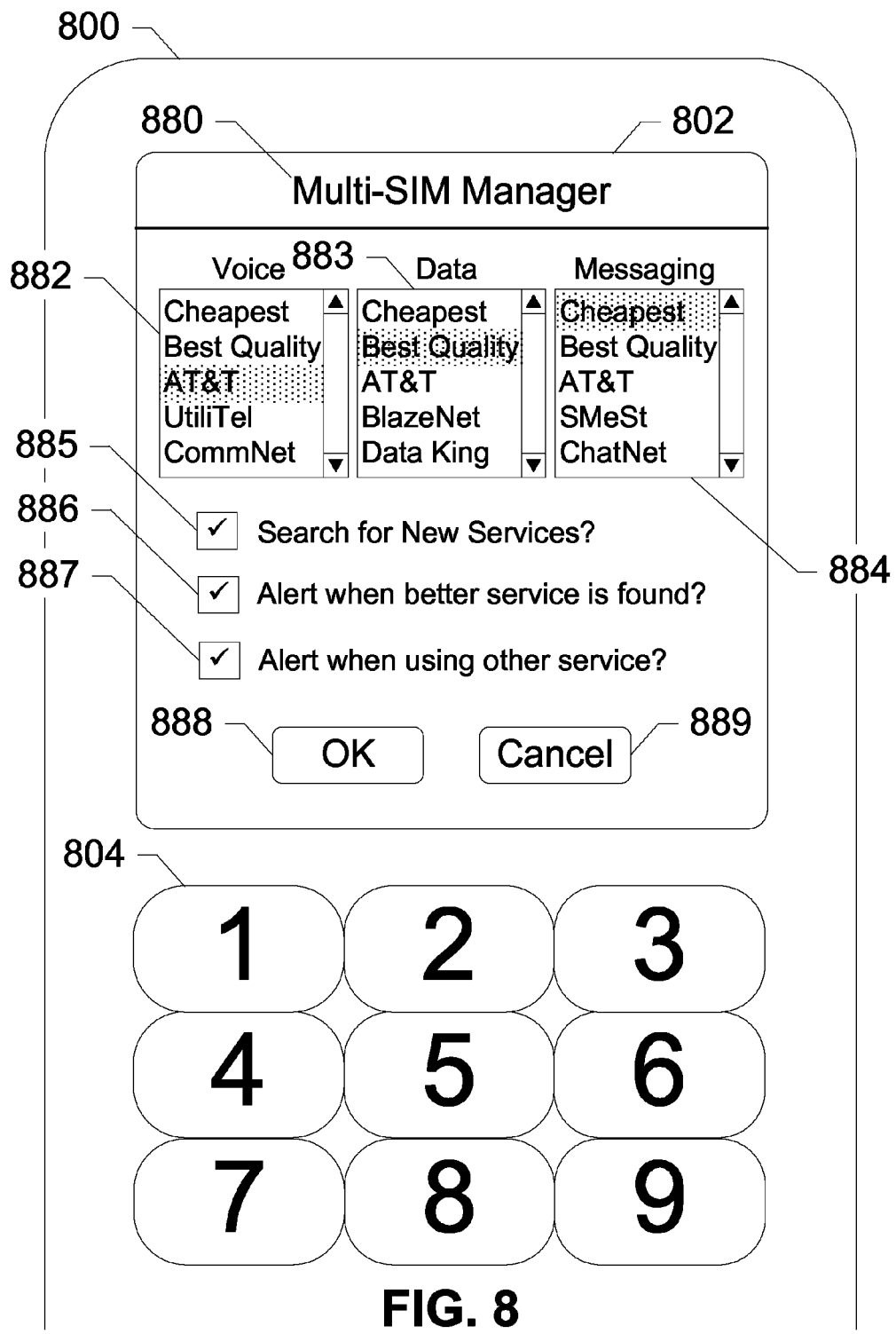
FIG. 8 shows a screen shot for managing a UICC capable of OTA carrier switching on a wireless communication device, according to an exemplary embodiment of the subject disclosure.

FIG. 8 shows a screen shot for managing a UICC capable of OTA carrier switching on a wireless communication device 800, according to an exemplary embodiment of the subject disclosure. Multi-SIM manager 880 includes a list of all subscribed voice services 882, subscribed data services 883, subscribed messaging services 884, search and alert options 885-887, an OK button 888, and a cancel button 889. The user may select one of these services to use all of the time, or may simply select "Cheapest" or "Best Quality" so that the UICC selects an available service meeting this criterion. The user can also command wireless communication device 800 to search for new services by selecting option 885. Wireless communication device 800 will receive and prompt the user with all offers for new services. For less offers, the user can elect for wireless communication device 800 to only entertain offers for better services by selecting option 886. When option 886 is selected, wireless communication device 800 will only entertain offers for services which would meet the selected criterion better than the current service. Since changes in service may be seamless or transparent to the user, the user can elect for wireless communication device 800 to alert the user when the UICC has switched carriers by selecting option 887. When these settings are satisfactory to the user, the user activates OK button 888 to save any changes and begin using the new settings. If the user wishes to discard the settings, cancel button 889 can be activated to discard any changes and revert to the previous settings.

It is possible to have multiple subscribers use the same wireless communication device and the same UICC, yet subscribe to different services. In exemplary embodiments for multiple subscribers, a special code is provisioned so that the UICC can allow the first subscriber to use a first virtual SIM(s) and the second subscriber to use the second virtual SIM(s). This security feature is implemented to make sure the first subscriber and the second subscriber cannot view each other's proprietary records. Using hypervisors enables secure separation between virtual SIMs. Also, the same subscriber may subscribe to the same service more than once using different identities (e.g., business and personal personas). The persona architecture is based on IMS IMPU (IP Multimedia Public Identity) for identity management and call routing logics. However, other methods to isolate virtual SIMs and identities may become apparent to those having ordinary skill in the art in light of this disclosure.

The foregoing disclosure of the exemplary embodiments of the present subject disclosure has been presented for purposes of illustration and description. It is not intended to be exhaustive or to limit the subject disclosure to the precise forms disclosed. Many variations and modifications of the embodiments described herein will be apparent to one of ordinary skill in the art in light of the above disclosure. The scope of the subject disclosure is to be defined only by the claims appended hereto, and by their equivalents.

Further, in describing representative embodiments of the present subject disclosure, the specification may have presented the method and/or process of the present subject disclosure as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present subject disclosure should not be limited to the performance of their steps in the order written, and one skilled in the art can readily appreciate that the sequences may be varied and still remain within the spirit and scope of the present subject disclosure.

What is claimed is:

1. A method comprising:

receiving, at a wireless communication device comprising a universal integrated circuit card, from a second carrier, an offer for a service as provided by the second carrier, the universal integrated circuit card of the wireless communication device comprising a memory storing a first virtual subscriber identity module provisioned with the service as provided by a first carrier;

determining, by the wireless communication device, whether the service as provided by the second carrier meets a criteria more than the service as provided by the first carrier;

in response to determining that the service as provided by the second carrier meets the criteria more than the service as provided by the first carrier, providing, by the wireless communication device to a user of the wireless communication device, a prompt associated with the offer for the service as provided by the second carrier, and accepting, by the wireless communication device, provisioning, on the universal integrated circuit card, of a second virtual subscriber identity module with the service as provided by the second carrier;

determining, by the wireless communication device, that provisioning the second virtual subscriber identity module on the universal integrated circuit card requires more memory than is available on the memory of the universal integrated circuit card;

in response to determining that provisioning the second virtual subscriber identity module on the universal integrated circuit card requires more memory than is available on the memory of the universal integrated circuit card, archiving, by the wireless communication device, the first virtual subscriber identity module stored on the memory of the universal integrated circuit card to a memory of the wireless communication device;

adding, by the wireless communication device, the second virtual subscriber identity module to the universal integrated circuit card; and utilizing, by the wireless communication device, the service as provided by the second carrier using the second virtual subscriber identity module to carry out a request for the service.

2. The method of claim 1, wherein the criteria is associated with a cost of service and wherein determining whether the service as provided by the second carrier meets the criteria more than the service as provided by the first carrier comprises determining whether the service as provided by the second carrier is cheaper than the service as provided by the first carrier.

3. The method of claim 2, wherein the criteria is associated with a quality of service and wherein determining whether the service as provided by the second carrier meets the criteria more than the service as provided by the first carrier comprises determining whether the service as provided by the second carrier is associated with a higher quality than the service as provided by the first carrier.

4. The method of claim 1, further comprising providing, to the user of the wireless communication device, an alert in response to switching from the first carrier to the second carrier to utilize the service as provided by the second carrier using the second virtual subscriber identity module to carry out the request for the service.

5. The method of claim 1, further comprising receiving an incentive with the offer for the service as provided by the second carrier.

6. The method of claim 1, further comprising receiving a demand that a specific international mobile subscriber identity number be assigned to the second virtual subscriber identity module added to the universal integrated circuit card.

7. The method of claim 6, wherein the specific international mobile subscriber identity number is one of the same as an international mobile subscriber identity number assigned to the first virtual subscriber identity module or different than the international mobile subscriber identity number assigned to the first virtual subscriber identity module.

8. The method of claim 1, wherein the universal integrated circuit card further comprises an antenna emulation module that allows an antenna of the wireless communication device to receive a signal associated with the second carrier and a signal associated with the first carrier and wherein the offer for the service as provided by the second carrier is transmitted to the wireless communication device in response to the second carrier detecting a new subscriber identity module attempting to access a network of the second carrier.

9. A universal integrated circuit card comprising:
a processor;
a first virtual subscriber identity module stored on a memory, the first virtual subscriber identity module provisioned with a service as provided by a first carrier; and
the memory further storing instructions that, when executed by the processor, cause the processor to perform operations comprising
receiving, from a second carrier, an offer for the service as provided by the second carrier,
determining whether the service as provided by the second carrier meets a criteria more than the service as provided by the first carrier,
in response to determining that the service as provided by the second carrier meets the criteria more than the service as provided by the first carrier,
causing a prompt associated with the offer for the service as provided by the second carrier to be provided to a user of a wireless communication device, and
accepting provisioning, via over-the-air provisioning, of a second virtual subscriber identity module with the service as provided by the second carrier,
determining that provisioning the second virtual subscriber identity module on the universal integrated circuit card requires more memory than is available on the memory of the universal integrated circuit card,
in response to determining that provisioning the second virtual subscriber identity module on the universal integrated circuit card requires more memory than is available on the memory of the universal integrated circuit card, archiving the first virtual subscriber identity module stored on the memory of the universal integrated circuit card to a memory of the wireless communication device,
adding the second virtual subscriber identity module to the universal integrated circuit card, and
utilizing the service using the second virtual subscriber identity module to carry out a request for the service.

10. The universal integrated circuit card of claim 9, wherein the first virtual subscriber identity module and the second virtual subscriber identity module are stored on an application layer of the memory of the universal integrated circuit card.

11. The universal integrated circuit card of claim 10, wherein the first virtual subscriber identity module and the second virtual subscriber identity module access a shared layer of the memory of the universal integrated circuit card, the shared layer comprising an over-the-air service manager, a service analyzer, and an address book.

12. The universal integrated circuit card of claim 11, wherein the shared layer is controlled by a hypervisor layer of the memory of the universal integrated circuit card.

13. The universal integrated circuit card of claim 9, wherein the memory of the universal integrated circuit card stores a plurality of subscriber data, a plurality of carrier data, and a plurality of shared carrier data.

14. The universal integrated circuit card of claim 9, further comprising an antenna emulation module that allows an antenna of the wireless communication device to receive a signal associated with the second carrier and a signal associated with the first carrier, wherein the offer for the service as provided by the second carrier is transmitted to the wireless communication device in response to the second carrier detecting a new subscriber identity module attempting to access a network of the second carrier.

15. A memory storing instructions that, when executed by a universal integrated circuit card of a wireless communication device, cause a processor of the universal integrated circuit card to perform operations comprising:
receiving, from a second carrier, an offer for a service as provided by the second carrier, the universal integrated circuit card of the wireless communication device storing a first virtual subscriber identity module provisioned with the service as provided by a first carrier on the memory;
determining whether the service as provided by the second carrier meets a criteria more than the service as provided by the first carrier;
in response to determining that the service as provided by the second carrier meets the criteria more than the service as provided by the first carrier,
causing a prompt associated with the offer for the service as provided by the second carrier to be provided to a user of the wireless communication device, and
accepting provisioning, via over-the-air provisioning, of a second virtual subscriber identity module with the service as provided by the second carrier on the universal integrated circuit card;
determining that provisioning the second virtual subscriber identity module on the universal integrated circuit card requires more memory than is available on the universal integrated circuit card;
in response to determining that provisioning the second virtual subscriber identity module on the universal integrated circuit card requires more memory than is available on the memory of the universal integrated circuit card, archiving the first virtual subscriber identity module stored on the memory of the universal integrated circuit card to a memory of the wireless communication device;

adding the second virtual subscriber identity module to the universal integrated circuit card; and utilizing the service as provided by the second carrier using the second virtual subscriber identity module to carry out a request for the service.

16. The memory of claim 15, wherein the criteria is associated with a cost of service and wherein determining whether the service as provided by the second carrier meets the criteria more than the service as provided by the first carrier comprises determining whether the service as provided by the second carrier is cheaper than the service as provided by the first carrier.

17. The memory of claim 15, wherein the criteria is associated with a quality of service and wherein determining whether the service as provided by the second carrier meets the criteria more than the service as provided by the first carrier comprises determining whether the service as provided by the second carrier is associated with a higher quality than the service as provided by the first carrier.

18. The memory of claim 15, wherein the operations further comprise providing, to the user of the wireless communication device, an alert in response to switching from the first carrier to the second carrier to utilize the service as provided by the second carrier using the second virtual subscriber identity module to carry out the request for the service.

19. The memory of claim 15, wherein the operations further comprise receiving an incentive with the offer for the service as provided by the second carrier.

20. The memory of claim 15, wherein the universal integrated circuit card comprises an antenna emulation module that allows an antenna of the wireless communication device to receive a signal associated with the second carrier and a signal associated with the first carrier, and wherein the offer for the service as provided by the second carrier is transmitted to the wireless communication device in response to the second carrier detecting a new subscriber identity module attempting to access a network of the second carrier.

\* \* \* \* \*